US005595624A

United States Patent [19]

Curiel

[11] Patent Number: 5,595,624

[45] Date of Patent: Jan. 21, 1997

[54] METHOD OF MAKING TAMPER EVIDENT AND COUNTERFEIT RESISTING INFORMATIONAL ARTICLE

[75] Inventor: Yoram Curiel, Aurora, Colo.

[73] Assignee: Optical Security Group, Inc., Denver, Colo.

[21] Appl. No.: 341,662

[22] Filed: Nov. 17, 1994

Related U.S. Application Data

[62] Division of Ser. No. 213,561, Mar. 16, 1994, Pat. No. 5,370,763, which is a continuation of Ser. No. 915,975, Jul. 17, 1992, abandoned.

[51] Int. Cl.$^{6}$ .................... G03H 1/00

[52] U.S. Cl. .................... 156/277; 156/289

[58] Field of Search .................... 156/277, 245, 156/275.5, 275.7, 289

[56] References Cited

U.S. PATENT DOCUMENTS

| | | |
|---|---|---|
| 2,400,079 | 5/1946 | Ducey . |
| 2,610,421 | 9/1952 | Horn . |
| 3,069,793 | 12/1962 | Francescon . |
| 3,582,439 | 6/1971 | Thomas . |
| 3,634,657 | 1/1972 | Ballard et al. . |
| 4,134,842 | 1/1979 | Orkin et al. . |
| 4,241,198 | 12/1980 | Kobayashi . |
| 4,246,307 | 1/1981 | Trautwein . |
| 4,324,421 | 4/1982 | Moraw et al. . |
| 4,368,979 | 1/1983 | Ruell . |
| 4,378,392 | 3/1983 | Segel . |
| 4,389,472 | 6/1983 | Neuhaus . |
| 4,429,015 | 1/1984 | Sheptak . |
| 4,510,006 | 4/1985 | Lawson . |
| 4,562,102 | 12/1985 | Rabuse et al. . |
| 4,627,642 | 12/1986 | Peronneau et al. . |
| 4,631,222 | 12/1986 | Sander . |
| 4,684,795 | 8/1987 | Colgate, Jr. . |
| 4,749,084 | 1/1988 | Pereyra . |
| 4,807,807 | 2/1989 | Glick . |
| 4,810,544 | 3/1989 | Hickman . |
| 4,856,857 | 8/1989 | Takeuchi et al. . |
| 4,897,533 | 1/1990 | Lyszczarz . |
| 4,938,830 | 7/1990 | Cannistra . |
| 4,971,646 | 11/1990 | Schell et al. . |
| 4,978,415 | 12/1990 | Jones . |
| 4,999,075 | 3/1991 | Coburn, Jr. . |
| 5,128,391 | 7/1992 | Shustack . |
| 5,149,571 | 9/1992 | Croell . |
| 5,154,962 | 10/1992 | Mertens et al. . |
| 5,248,544 | 9/1993 | Kaule . |
| 5,267,753 | 12/1993 | Chock . |

FOREIGN PATENT DOCUMENTS

| | | |
|---|---|---|
| 2026750 | 8/1978 | United Kingdom . |
| PCT/US88/03581 | 10/1988 | WIPO . |

*Primary Examiner*—David A. Simmons
*Assistant Examiner*—Linda L. Gray
*Attorney, Agent, or Firm*—David V. Radack; Eckert Seamans Cherin & Mellott

[57] ABSTRACT

A method of protecting an informational article, on which variable information is inserted, from photocopy duplication and alteration. The method comprises providing an informational article substrate having a zone for inserting the variable information and a refractive image disposed within the zone. The variable information is inserted in the zone, and transparent tape is secured over the variable information. The transparent tape has a write-resistant exposed surface. The refractive image will resist photocopy duplication of the variable information article, and the write-resistant exposed surface will resist alteration of the inserted variable information.

10 Claims, 2 Drawing Sheets

METHOD OF MAKING TAMPER EVIDENT AND COUNTERFEIT RESISTING INFORMATIONAL ARTICLE

This application is a divisional of application Ser. No. 08/213,561 filed Mar. 16, 1994, now U.S. Pat. No. 5,370, 763, which is a continuation of application Ser. No. 07/915, 975 filed Jul. 17, 1992, now abandoned.

BACKGROUND OF THE INVENTION

1. Field of the Invention

The present invention relates to informational articles which are provided with a zone within which information will be provided either in handwritten or printed form and, more specifically, it relates to providing such an article wherein both counterfeiting, through photocopying, and alteration through manual or printed means are resisted.

2. Description of the Prior Art

It has been known for many purposes to provide means to protect informational articles from counterfeiting and alteration. For example, with respect to paper currency, it has been known to use special inks, graphic designs, codes and materials to make it more difficult for counterfeiters to copy the currency.

It has also been known to protect cards from deterioration and alteration by encasing them between a pair of laminated plastic sheets.

It has also been known to employ holograms in credit cards so as to inhibit unauthorized reproduction.

A unique problem exists in respect of certain items which must be completed by an intermediary after initial manufacture prior to delivery to the end user. For example, in a typical motor vehicle temporary registration plate, the state has had printed on paper or paperboard all of the information required for the temporary registration which is to be employed until the permanent license plate is received, except the date of expiration. The date of expiration is typically applied by the use of a pen, marker or other printing means by the dealer at the time of sale. It is obviously important that the temporary plate be such that it cannot be easily counterfeited by photocopying and the information provided by the dealer as to expiration date cannot be altered.

In spite of the foregoing known systems, there remains a need for informational articles, such as temporary vehicle registration plates, which will resist counterfeiting and alteration subsequent to the dealer's insertion of the required information.

SUMMARY OF THE INVENTION

The present invention has met the above-described need by providing a means for an informational article, such as a temporary license plate as supplied by the state, to inherently resist counterfeiting by photocopying and also further means to resist any alteration of the information inserted by the vehicle dealer.

The informational article has a preprinted side containing basic information, such as the state in which it is effective and a zone on such side for insertion of the expiration date by the dealer. It is obvious that such temporary plates must be sufficiently large as to be viewable from a substantial distance such that a law enforcement officer, for example, could without getting out of his or her vehicle, quickly determine whether the temporary vehicle registration has expired.

The present invention provides a pattern within the zone which preferably is a refractive image, such as a hologram so as to resist reproduction by a form of photocopying. Efforts to photocopy, even on paper of identical color as the original form would fail to reproduce the refractive image and thereby preclude photocopying as a means of counterfeiting the temporary registration plate.

Also, the invention contemplates the dealer after applying the date of expiration within the zone placing an adhesively bonded transparent tape which might be made of a polyester or polyolefin, for example, over that area. The tape preferably is covered with a write resistant coating which is preferably a silicone resin to which a wax, such as polytetrafluoroethylene, has been added.

The method of the present invention involves providing such an informational article, inserting the information within the zone with at least a portion of it being on the pattern to resist reproduction and thereafter applying the write resistant protective tape thereover to adhesively bond the same.

It is an object of the present invention to provide an efficient means for resisting counterfeiting by photocopying or alteration of an information containing article.

It is a further object of the present invention to provide such an article and the associated method wherein the original form must have information added to it before it can become effective.

It is a further object of the present invention to provide a refractive image in the zone in which the information is provided and for subsequent protective pressure-sensitive adhesive application of a write resistant treated transparent tape.

It is a further object of the present invention to provide such a system which may be employed economically and without the need for special skills or equipment on the part of the individual completing the article by adding the required information.

These and other objects of the invention will be more fully understood from the following description of the invention on reference to the illustration appended hereto.

DESCRIPTION OF THE PREFERRED EMBODIMENTS

As used herein, the term "refractive image" means any visually perceptible contrasting portion which has contrast increased upon exposure to either natural or artificial light and shall include, but not be limited to photographs, illustrations, printed patterns, colors, and holograms.

As used herein, the term "informational article" means an article or portion thereof which is intended to communicate information and will expressly include, but not be limited to temporary vehicle registration plates, security signs, labels and cards, checks, bank drafts, money orders, and other types of informational signs, labels, and cards.

Figure 1:
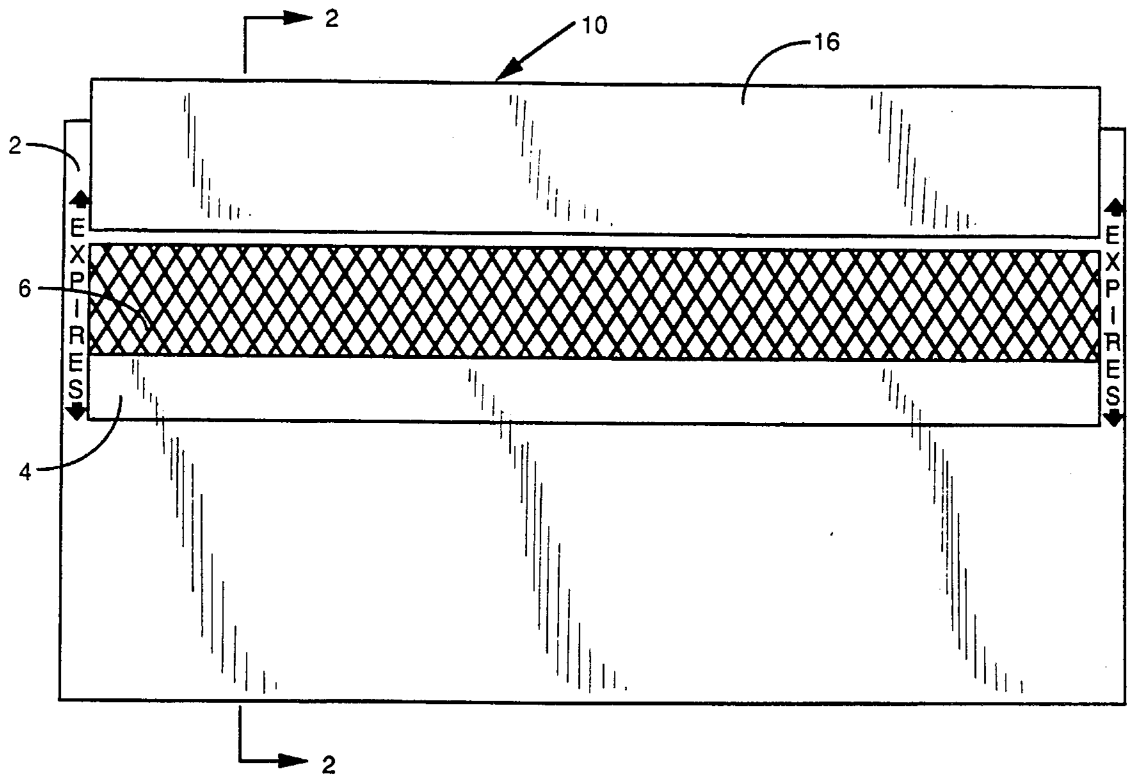
FIG. 1 is a front elevational view of a specimen temporary vehicle registration plate of the present invention.
Figure 2:
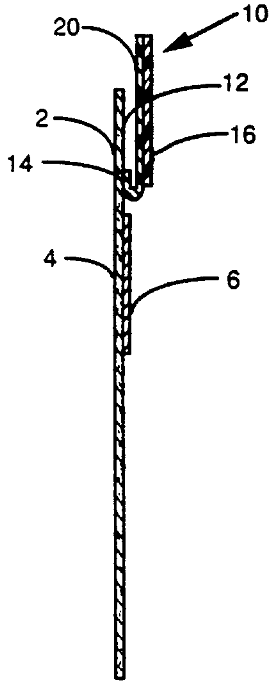
FIG. 2 is a cross-sectional illustration of the temporary plate of the present invention taken through 2—2 of FIG. 1.

Referring now in greater detail to FIGS. 1 and 2 there is shown a paper or paperboard temporary registration form prior to insertion of the expiration date. The form is generally rectangular in shape and may have the size on the order of about 8 to 12 inches by about 4 to 8 inches. It is printed on one side and, in the form shown, has information regarding the state in the upper horizontal portion 2. It also has a horizontal zone 4 underlying zone 2 within which the expiration date will be inserted by the vehicle dealer either by the use of a pen, or marker to provide a thicker line, or by suitable printing means. Zone 4 may be considered as having upper and lower limits between the arrow points disposed above and below the word "EXPIRES" on both sides of zone 4. The blank space underlying zone 4 may be employed to provide a vehicle serial number, if desired.

Within the zone 4 is a pattern 6 which preferably is a refractive image such that any effort to counterfeit the temporary registration form by photocopying will be defeated. The preferred form of refractive image would be a hologram which, in the form shown, has a plurality of repeated diamond shapes such that as the form is moved in either natural or artificial light, varying colors will be seen within each zone. As a result, even if one were to photocopy the blank form on paper or paperboard of the identical color employed by the state, the color produced by the hologram would not be duplicated in appearance. Further, even in the less preferred use of patterns or refractive images which do not have holograms, it is generally preferred to employ a pattern on a reflective background as this is difficult to photocopy. When the dealer sells a vehicle, he or she will insert, either manually or by printing means, in large numbers which can be viewed from a substantial distance, the date of expiration of the temporary registration within zone 4. The pattern 6 may be integrally provided in zone 4 or may be formed on a separate element which is adhesively bonded within zone 4 or provided as a coating.

Shown in FIGS. 1 and 2 is a tape member 10 which has been presecured to the printed face 12 of the temporary plate by suitable pressure-sensitive adhesive means within region 14 of the tape assembly 10 which can be either within zone 4 or adjacent thereto. The tape assembly 10 which is folded upwardly could be stored in a downward position overlying pattern 6. The tape assembly 10 has a strippable protective web 16 secured to the adhesive side of tape 20 to resist undesired premature sticking. Tape 20 is transparent and preferably composed of a material selected from the group consisting of polyester and polyolefins with polyethylene and polypropylene being among the preferred materials in the latter generic category. The information is inserted within zone 4 in at least partial overlying position with respect to pattern 6 which, preferably, is a continuous tape or coating, but may in the alternative, be segmented so as to provide discrete areas of the dates. Protective web 16 is then removed from tape 20 and protective web 16 is urged downwardly in overlying position with respect to the information provided in zone 4 and secured thereto in surface-to-surface contact by means of the pressure-sensitive adhesive on the undersurface of tape 20. If desired, tape assembly 10 may be provided as a separate member rather than one that was presecured.

The exposed surface of the protective web tape preferably has a coating of a silicone resin so as to resist any efforts to write thereon in a manner that would overlay and alter the dates. In the most preferred form of the invention, about 2½ to 10 percent by weight of a wax is incorporated in the silicone resin so as to enhance the write resistant characteristics in respect of marker pens, crayons, pens, and the like. This renders the exposed surface of tape 20 non-wetting with respect to inks. The preferred silicone resin is a heat curable resin. The preferred wax is polytetrafluoroethylene.

Figure 3:
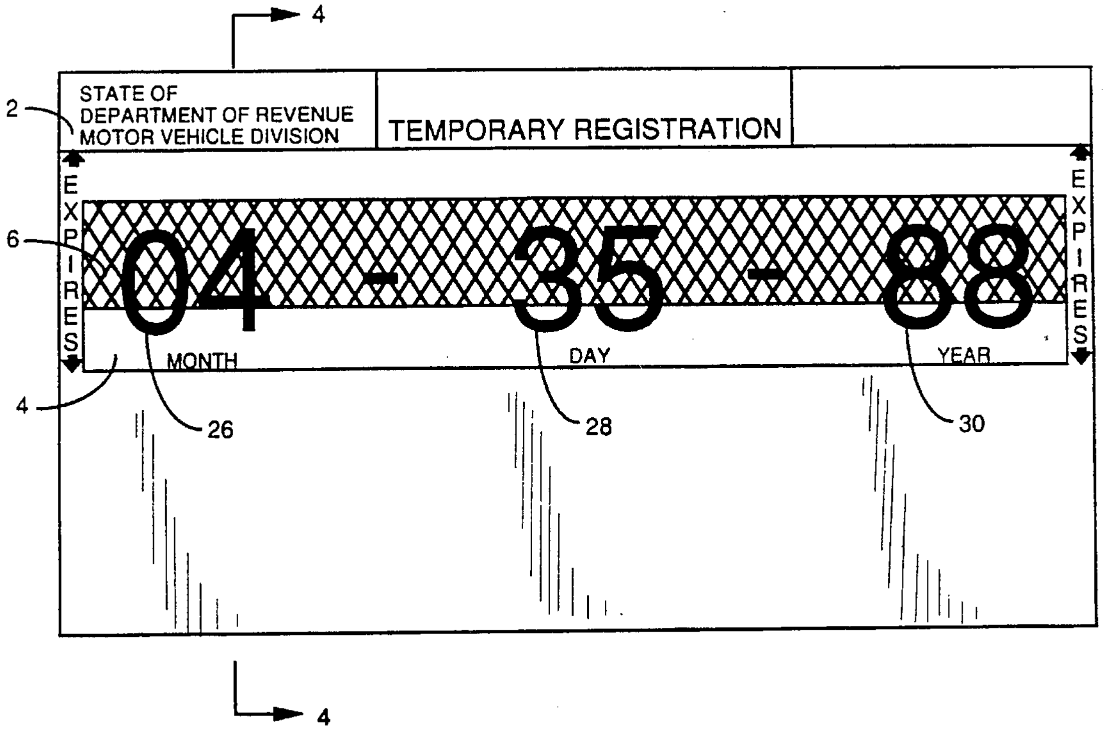
FIG. 3 is a front elevational view of the specimen temporary vehicle registration plate of FIG. 1 after insertion of the information and applying the protective means.
Figure 4:
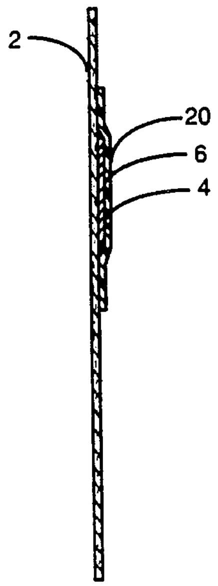
FIG. 4 is a cross-sectional illustration of the completed informational article of FIG. 3.

Referring to FIGS. 3 and 4, the completed temporary plate will be considered. As shown, the protective tape 20 overlies patterned portion 6 with the month 26, day 28, and year 30 being in partial overlying position with respect to the patterned portion 6 and partially overlying other portions of zone 4. Day 28 is shown as "35" for illustrative purposes only. In actual use, a number between 01 and 31 will be shown. The tape 20 is adhesively secured in overlying surface-to-surface position with respect to zone 4.

It will be appreciated that in this manner, any effort to either counterfeit the temporary registration form before or after completion will be resisted and the ability to either alter the numbers or write over the same will also be inhibited due to the presence of the transparent tape which has been protectively covered.

Further, any effort to lift tape 20 will result in the adhesive taking with it at least portions of the information receiving zone 4 which are not covered by pattern 6 and, if desired, portions of pattern 6. Suitable adhesives for use on the tape are an acrylic base pressure-sensitive adhesive for paper or paperboard articles and a rubber based adhesive for plastic articles, for example.

It will be noted that in the preferred embodiment the height of the pattern is about 40 to 60 percent of zone 4 in which the information will be inserted. In this manner, a portion of the numbers or other information will be applied over the pattern and a portion will not. The presence of a pattern underlying a portion of the number enhances the counterfeit protection. Also, the presence of the information on the article itself and on the pattern makes it more difficult for one to attempt to remove the tape without destroying the underlying materials.

The method of the present invention involves providing the appropriate form, inserting the desired information in at least partial overlying relationship with respect to the pattern and thereafter covering the information within the zone 4 by means of an adhesively bonded transparent tape member 20 which has its exterior surface write resistant treated.

It will be appreciated that the present invention provides a simple and effective means of resisting both counterfeiting and alteration of informational articles, such as temporary vehicle registration plates. The invention is sufficiently inexpensive to use as to be adapted for use in disposable items.

It will be appreciated that while prime focus of the invention has been directed toward temporary vehicle registration plates, it may be used in other environments wherein counterfeit and alteration protection is desired with particular emphasis in those instances where the creator and authorized user of the form is not the one who puts in additional information. For example, industrial or governmental vehicular or individual dated or coded security passes may be rendered more reliable by the present invention. While for convenience of disclosure reference has been made herein to use of the invention on paper or paperboard articles, the invention is not so limited. It may be used on plastic, metal, or laminated materials, for example. A vinyl or polyvinylchloride may be employed, if desired.

Whereas particular embodiments of the invention have been described above for purposes of illustration, it will be evident to those skilled in the art that numerous variations of the details may be made without departing from the invention as defined in the appended claims.

I claim:

1. A method of protecting an informational article comprising:

providing an article having a first zone for inserting information and a pattern disposed within said zone;

inserting information in said zone;

securing a transparent tape over said information, whereby said pattern will resist photocopy duplication of said article and said tape will resist alteration of said inserted information;

employing a refractive image as said pattern;

employing a hologram as said refractive image;

providing on said tape a coating of a silicone resin on the exposed surface thereof;

providing about 2½ to 10 percent by weight wax in said silicone resin;

employing a polytetrafluoroethylene wax as said wax;

adhesively bonding said tape over said inserted information;

adhesively bonding a portion of said tape to said article prior to inserting said information; and inserting said information by manual or printing means.

2. The method of claim 1 including employing said method on a paper or paperboard article which has printed information in regions other than said zone.

3. The method of claim 2 including employing said method to create a temporary vehicle registration.

4. A method of protecting an informational article, on which variable information is inserted, from photocopy duplication and alteration, said method comprising:

providing an informational article substrate having a zone for inserting said variable information and a refractive image disposed within said zone;

inserting said variable information in said zone;

securing a transparent tape having a write-resistant exposed surface over said variable information, whereby said refractive image will resist photocopy duplication of said informational article and said write-resistant exposed surface will resist alteration of said inserted variable information; and adhesively bonding a portion of said tape to said informational article prior to inserting said variable information.

5. The method of claim 4, including employing a hologram as said refractive image.

6. The method of claim 5, including providing on said tape a coating of a silicone resin on the exposed surface thereof.

7. The method of claim 6 including providing about 2½ to 10 percent by weight wax in said silicone resin.

8. The method of claim 7, including employing a polytetrafluoroethylene wax as said wax.

9. The method of claim 8, including adhesively bonding said tape over said inserted variable information.

10. The method of claim 9, including employing said method on a paper or paperboard article which has printed information in regions other than said zone.

* * * * *